(12) United States Patent
Paterno et al.

(10) Patent No.: US 11,111,843 B2
(45) Date of Patent: Sep. 7, 2021

(54) ADJUSTABLE TRIM SYSTEM FOR A TURBOCHARGER COMPRESSOR INCLUDING A PORTED SHROUD

(71) Applicant: GM GLOBAL TECHNOLOGY OPERATIONS LLC, Detroit, MI (US)

(72) Inventors: Achille Paterno, Rivalta di Torino (IT); Calogero Avola, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/747,847

(22) Filed: Jan. 21, 2020

(65) Prior Publication Data

US 2021/0222612 A1 Jul. 22, 2021

(51) Int. Cl.
*F02B 37/22* (2006.01)
*F01D 25/24* (2006.01)

(52) U.S. Cl.
CPC .............. *F02B 37/22* (2013.01); *F01D 25/24* (2013.01); *F05D 2220/40* (2013.01)

(58) Field of Classification Search
CPC ....... F02B 37/22; F01D 25/24; F05D 2220/40
See application file for complete search history.

(56) References Cited

U.S. PATENT DOCUMENTS

| | | | |
|---|---|---|---|
| 7,736,126 B2 | 6/2010 | Joco et al. | |
| 8,206,133 B2 | 6/2012 | Mudel | |
| 8,882,444 B2 | 11/2014 | Williams et al. | |
| 9,528,527 B2 | 12/2016 | Sekularac et al. | |
| 9,657,634 B2 | 5/2017 | Marlett et al. | |
| 9,719,518 B2 | 8/2017 | Mohtar et al. | |
| 9,759,228 B2 | 9/2017 | Romblom et al. | |
| 9,777,737 B2 | 10/2017 | Houst et al. | |
| 9,816,447 B2 | 11/2017 | Jankovic et al. | |
| 9,951,793 B2 | 4/2018 | Lucas | |
| 10,309,417 B2 | 6/2019 | Harris et al. | |
| 10,316,859 B2 | 6/2019 | Harris et al. | |
| 10,393,009 B2 | 8/2019 | Mohtar et al. | |
| 10,465,706 B2 | 11/2019 | Lombard et al. | |
| 2018/0306102 A1* | 10/2018 | Wang | F02B 37/186 |
| 2019/0048876 A1* | 2/2019 | Mohtar | F04D 29/4226 |

* cited by examiner

*Primary Examiner* — Audrey B. Walter
*Assistant Examiner* — Edward Bushard
(74) *Attorney, Agent, or Firm* — Vivacqua Crane

(57) ABSTRACT

An adjustable trim system for a turbocharger compressor including a ported shroud for a vehicle propulsion system includes a compressor inlet adjustor positioned in a compressor air inlet and being continuously adjustable between a fully open configuration, a ported shroud closed configuration, and a partially-open ported shroud recirculation configuration between the fully open configuration and the ported shroud closed configuration, and a compressor inlet adjustor control module that adjusts the configuration of the compressor inlet adjustor to a configuration between the fully open configuration and the ported shroud closed configuration when the turbocharger pressure ratio is higher than a predetermined pressure ratio threshold and the compressor corrected air flow into the compressor housing inlet is less than a maximum compressor corrected air flow of a compressor flow map for the turbocharger compressor.

14 Claims, 6 Drawing Sheets

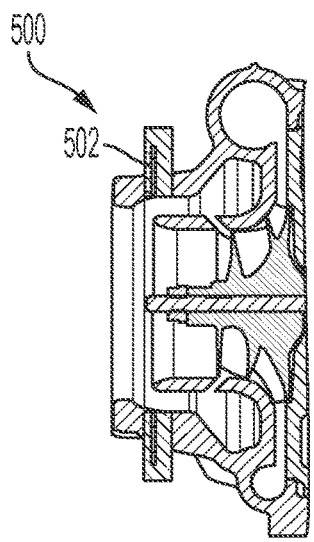 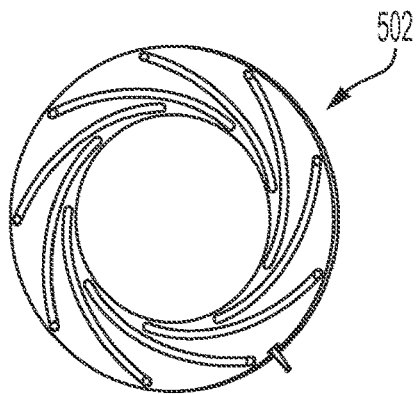
FIG. 5A  FIG. 5B
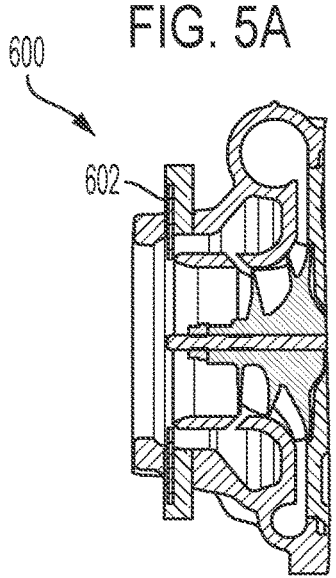 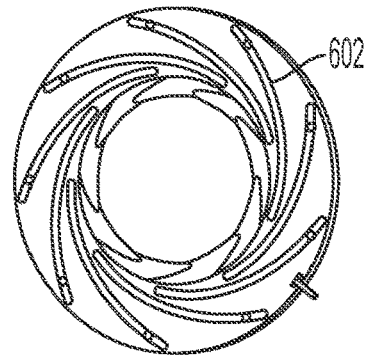
FIG. 6A  FIG. 6B
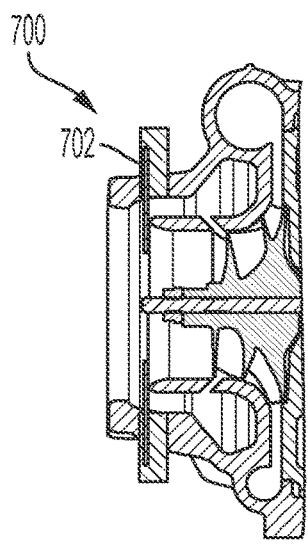 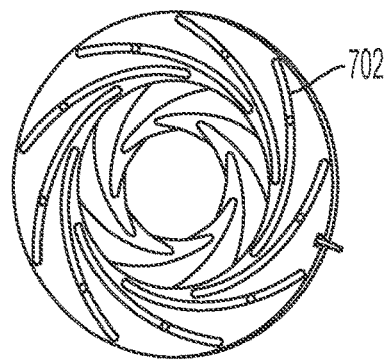
FIG. 7A  FIG. 7B

ADJUSTABLE TRIM SYSTEM FOR A TURBOCHARGER COMPRESSOR INCLUDING A PORTED SHROUD

FIELD

The present disclosure relates to an adjustable trim system for a turbocharger compressor including a ported shroud.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Turbochargers are used to increase the intake air pressure of internal combustion engines and are increasingly being used to increase internal combustion engine output with lower engine displacements and improved fuel efficiency. A turbocharger includes a turbine wheel and a compressor wheel, generally mounted on a common shaft and disposed in separate housings. Engine exhaust is routed through the turbine where it drives a turbine wheel that generally includes an impeller having blades or vanes and is coupled, directly or indirectly, to a compressor wheel that also generally includes an impeller having blades or vanes. The compressor wheel draws in intake air, generally through a filtration system and into an inlet duct where it is drawn across the blades or vanes, compressed and supplied to the intake port or manifold of the engine.

To increase compressor performance, bypass ports are added to the compressor inlet. These ports may be added in several forms, including as a ported shroud. A compressor without a bypass port generally has a single inlet to the compressor wheel that is defined by the compressor housing. A ported shroud bypass port provides a compressor inlet that has an inner and outer portion. A ported shroud bypass port compressor may have a housing like those of compressors that do not have a port, where the housing defines a compressor inlet and outlet, but it also has an additional outer wall separated from the (inner) inlet wall. In such configurations, the compressor wheel is mounted in a central portion of the compressor housing within the inner wall of the inlet and the bypass port is defined by an additional outer wall that forms a shroud around the inner wall of the compressor housing. The inner wall extends beyond the compressor wheel but does not extend as far outwardly as the outer wall. The bypass portion of the inlet or bypass channel lies between the outer surface of the inner wall and the inner surface of the outer wall. The main or inner portion of the inlet includes a central channel, defined within the inner surface of the inner wall and provides a path to the face of the compressor wheel. The inner portion of the inlet also has a channel, or channels, defined between the main inlet and the inner surface of the inner wall, through the wall to the outer surface of the inner wall that fluidly connects the bypass portion of the inlet, and the bypass port. The annular channel(s) open into the inner surface of inner wall proximate the vanes or blades of the compressor wheel.

A bypass port increases the operating range of a compressor by expanding the extent of both its low mass flow range and the high mass flow range. The low mass flow range is limited by a phenomenon referred to as "surge," where the pressure ratio exceeds the compressor capability and is limited at high mass flow by a phenomenon referred to as "choke," where the system's air requirements exceed the maximum flow rate of the compressor. The annular channel, or port, in communication with the compressor wheel acts as a bypass. At low mass flows, which would otherwise cause a surge condition without the bypass port, the presence of the bypass port allows flow back from the compressor wheel to the main inlet, thereby allowing the system to reach equilibrium at lowest mass flows. This flow back from the compressor wheel to the main inlet is known as recirculation and the ported shroud operates in a "recirculation mode" in these conditions. At high mass flows, which would otherwise cause a choke condition without the bypass port, the presence of the port allows extra air to be drawn directly into the bypass port from the main inlet and supplied to the blades of the compressor wheel. Due to the extended operational range, compressors configured with this type of inlet are sometimes known as "map width enhanced" compressors. It is desirable to increase the operational range over which the turbocharger may be efficiently operated while improving performance.

SUMMARY

In an exemplary aspect, an adjustable trim system for a turbocharger compressor including a ported shroud for a vehicle propulsion system includes a turbine housing and a turbine wheel mounted in the turbine housing and connected to a rotatable shaft, a compressor housing and a compressor wheel mounted in the compressor housing and connected to the rotatable shaft. The compressor housing having an air inlet wall defining an air inlet for leading air generally axially into the compressor wheel. The compressor housing further defining a ported shroud system defining a shroud inner wall and a shroud outer wall. The shroud outer wall is spaced radially outward of the shroud inner wall and defining an annular space between the shroud inner wall and the shroud outer wall. A first shroud port formed through the shroud inner wall and extending to the compressor wheel for allowing air to pass between the annular space and the compressor wheel, and a second shroud port formed through the shroud inner wall and extending into the air inlet of the compressor housing and positioned upstream of the first shroud port for allowing air to pass between the annular space and the compressor housing air inlet. A compressor inlet adjustor positioned in the compressor air inlet and being continuously adjustable between a fully open configuration, a ported shroud closed configuration, and a partially-open ported shroud recirculation configuration between the fully open configuration and the ported shroud closed configuration. The compressor air inlet upstream of the compressor inlet adjustor is narrower than the compressor inlet adjustor in the fully open configuration. An inner radius of the compressor inlet adjustor equals an inner radius of the second shroud port in the ported shroud closed configuration such that the second shroud port is closed and the air inlet of the compressor housing is fully open when in the ported shroud closed configuration. A turbocharger compressor temperature module including a compressor inlet air temperature input in communication with a compressor inlet air temperature sensor, and a compressor outlet air temperature input in communication with a compressor outlet air temperature sensor. A turbocharger compressor pressure module including a compressor inlet air pressure input in communication with a compressor inlet air pressure sensor, and a compressor outlet air pressure input in communication with a compressor outlet air pressure sensor. The turbocharger compressor pressure module determines a turbocharger pressure ratio based upon the compressor inlet air pressure input and the compressor outlet air pressure input. A turbocharger compressor corrected air flow module that determines a compressor corrected air flow into the compressor housing air inlet based upon the compressor inlet air temperature input, compressor outlet air temperature input, compressor inlet air pressure input, and compressor outlet air pressure input, and a compressor inlet adjustor control module that adjusts the configuration of the compressor inlet adjustor based upon the turbocharger pressure ratio and the compressor corrected air flow. The compressor inlet adjustor control module adjusts the configuration of the compressor inlet adjustor to a configuration between the fully open configuration and the ported shroud closed configuration when the turbocharger pressure ratio is higher than a predetermined pressure ratio threshold and the compressor corrected air flow into the compressor housing inlet is less than a maximum compressor corrected air flow of a compressor flow map for the turbocharger compressor.

In another exemplary aspect, the predetermined pressure ratio threshold is between about 2 and 2.8.

In another exemplary aspect, the predetermined pressure ratio threshold is about 2.5.

In another exemplary aspect, the ported shroud system operates in a recirculation mode whereby air flows from the first shroud port to the second shroud port when the compressor inlet adjustor control module adjusts the configuration of the compressor inlet adjustor to a configuration between the fully open configuration and the ported shroud closed configuration when the turbocharger pressure ratio is higher than the predetermined pressure ratio threshold and the compressor corrected air flow into the compressor housing inlet is less than a maximum compressor corrected air flow of a compressor flow map for the turbocharger compressor.

In another exemplary aspect, the compressor inlet adjustor control module adjusts the configuration of the compressor inlet adjustor to a reduced inlet configuration when the turbocharger pressure ratio is lower than the predetermined pressure ratio threshold and the compressor corrected air flow into the compressor housing inlet is less than a predetermined compressor corrected air flow.

In another exemplary aspect, an inner radius of the compressor inlet adjustor is less than an inner radius of the second shroud port in the reduced inlet configuration.

In another exemplary aspect, the compressor inlet adjustor control module adjusts the configuration of the compressor inlet adjustor to the ported shroud closed configuration when the turbocharger pressure ratio is lower than the predetermined pressure ratio threshold and the compressor corrected air flow into the compressor housing inlet is higher than a predetermined compressor corrected air flow.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 5A is a cross-sectional view of a compressor portion of a turbocharger with a compressor inlet adjustor in a fully open configuration;

FIG. 5B is an elevation view of the compressor inlet adjustor of FIG. 5A in the fully open configuration;

FIG. 6A is a cross-sectional view of a compressor portion of a turbocharger with a compressor inlet adjustor in a ported shroud closed configuration;

FIG. 6B is an elevation view of the compressor inlet adjustor of FIG. 6A in the ported shroud closed configuration;

FIG. 7A is a cross-sectional view of a compressor portion of a turbocharger with a compressor inlet adjustor in a reduced inlet configuration;

FIG. 7B is an elevation view of the compressor inlet adjustor of FIG. 7A in the reduced inlet configuration;

DETAILED DESCRIPTION

Figure 1:
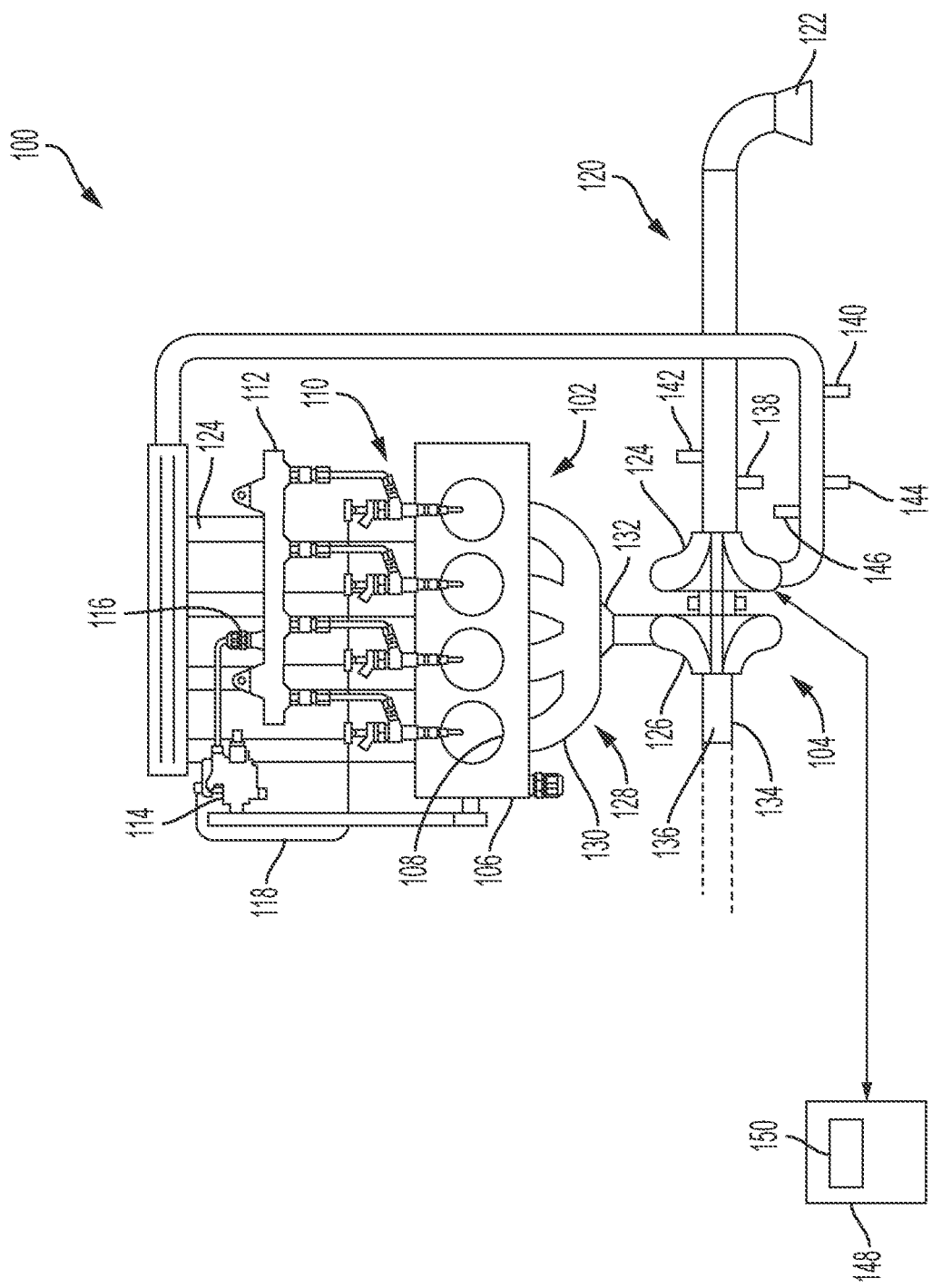
FIG. 1 is a schematic view of a vehicle propulsion system including an internal combustion engine with a turbocharger in accordance with an exemplary embodiment of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring now to the drawings, wherein like reference numbers correspond to like or similar components throughout the several figures, FIG. 1 illustrates a vehicle propulsion system 100 including an internal combustion engine 102 with a turbocharger 104 in accordance with an exemplary embodiment of the present disclosure. Internal combustion engine 102 includes an engine block 106 provided with several piston cylinders, one of which is indicated at 108. Engine block 106 also includes an engine head (not shown) that is mounted across cylinders 108. Internal combustion engine 102 also includes a plurality of fuel injectors, one of which is indicated at 110, that may be supported in the cylinder head. Fuel injectors 110 are fluidically connected to a fuel injection manifold 112. Fuel injection manifold 112 includes a fuel injection controller 114 that delivers fuel to fuel injectors 110 through a fuel inlet 116. Fuel injection controller 114 also controls fuel injection timing and/or fuel injection quantity through a control lead 118.

Internal combustion engine 102 also includes an air intake system 120 fluidically connected to engine block 106. Air intake system 120 includes an air inlet 122 that delivers air to a plurality of discharge conduits 124 fluidically connected to engine block 106 (typically to the engine cylinder head). Air intake system 120 also includes a turbocharger 104 having a compressor portion 124 and a turbine portion 126. Compressor portion 124 is fluidically connected between air inlet 122 and discharge conduits 124. Turbine portion 126 is fluidically connected to an exhaust system 128. Exhaust gases passing through exhaust system 128 drive turbine portion 126. Turbine portion 126 drives compressor portion 124 to compress inlet air passing through air intake system 120. Exhaust system 128 includes an exhaust manifold 130 fluidically connected to engine block 106, typically through the cylinder head, and an exhaust outlet 132 that delivers exhaust gases to turbocharger 104. Exhaust gases pass from an outlet 134 of turbine portion 126 through an exhaust conduit 136 to one or more emissions reduction devices (not shown).

Air intake system 120 includes a compressor inlet air temperature sensor 138 arranged upstream of compressor portion 124 and a compressor outlet air temperature sensor 140 arranged downstream of compressor portion 124. Additionally, a compressor inlet air pressure sensor 142 is arranged upstream of compressor portion 124 and a compressor outlet air pressure sensor 144 is arranged downstream of compressor portion 124. Compressor inlet air temperature sensor 138 and compressor inlet air pressure sensor 142 may be combined into a single sensor. In an exemplary embodiment, some of these sensors may not be physically present. Rather, for example, an engine control module may estimate these values based upon a simulation model. Similarly, compressor outlet air temperature sensor 140 and compressor outlet air pressure sensor 144 may be combined into a single sensor. Further, air intake system 120 may also include an air flow sensor 146 that detects air flow volume and/or velocity through compressor portion 124.

In accordance with an exemplary embodiment, internal combustion engine 102 includes a turbocharger controller 148. The turbocharger controller 148 includes a compressor inlet adjustor control module 150 that adjusts the configuration of a compressor inlet adjustor based upon a turbocharger pressure ratio and a compressor corrected air flow as will be further described below. The turbocharger controller 148 is in communication with the compressor inlet air temperature sensor 138, the compressor outlet air temperature sensor 140, the compressor inlet air pressure sensor 142, and the compressor outlet air pressure sensor 144.

Figure 2:
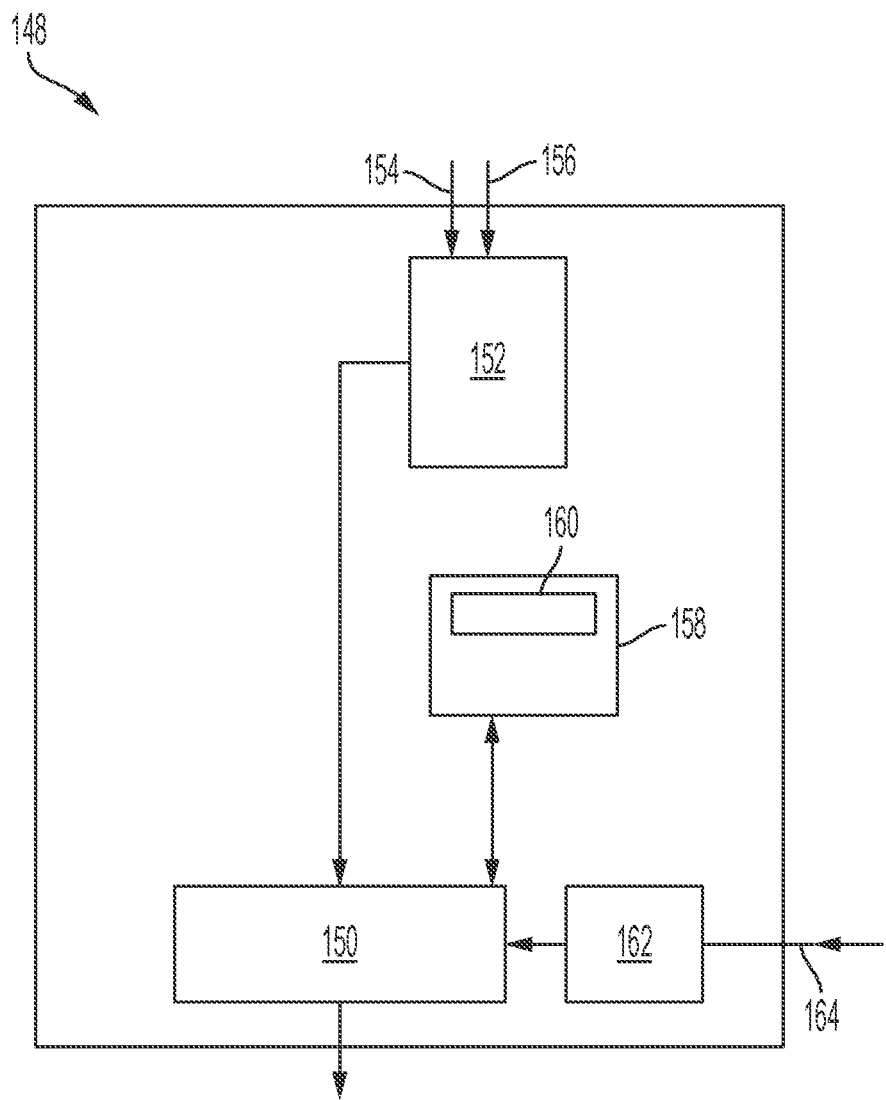
FIG. 2 is an illustration of a dataflow diagram that illustrates various elements that may be embedded within a turbocharger in accordance with an exemplary embodiment of the present disclosure.

FIG. 2 is an illustration of a dataflow diagram that illustrates various elements that may be embedded within the turbocharger 104. Various embodiments of turbocharger controller 148 of FIG. 1, according to the present disclosure, may include any number of sub-modules that may be combined or further partitioned as well. Turbocharger controller 148 includes a compressor inlet adjustor control module 150 that includes various algorithms that, when implemented, controls a compressor inlet adjustor (described below). Turbocharger controller 148 further includes a turbocharger compressor pressure module 152 operatively connected to compressor inlet adjustor control module 150. Turbocharger compressor pressure module 152 includes a compressor inlet air pressure input 154 operatively connected to compressor inlet air pressure sensor 142 (FIG. 1) and a compressor outlet air pressure input 156 operatively connected to compressor outlet air pressure sensor 144.

In further accordance with an exemplary embodiment, turbocharger controller 148 includes a memory module 158 operatively connected to compressor inlet adjustor control module 150. Memory module 158 stores a compressor inlet adjustor look-up table 160. In addition, turbocharger controller 148 includes a compressor air flow module 162 having a compressor air flow input 164 operatively connected to compressor air flow sensor 146. As will be discussed more fully below, compressor inlet adjustor control module 150 controls a compressor inlet adjustor based on current ambient conditions and turbocharger efficiency. Further, turbocharger controller 148 will adjust the compressor inlet adjustor based upon a sensed compressor pressure ratio and air flow through the compressor 124.

Figure 3B:
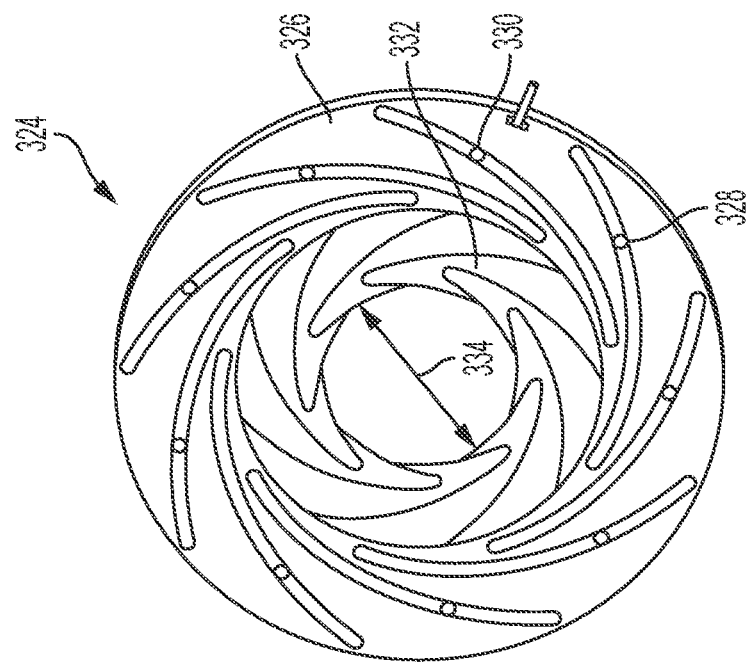
FIG. 3B is an elevation view of a compressor inlet adjustor for the turbocharger of FIG. 3A.
Figure 3A:
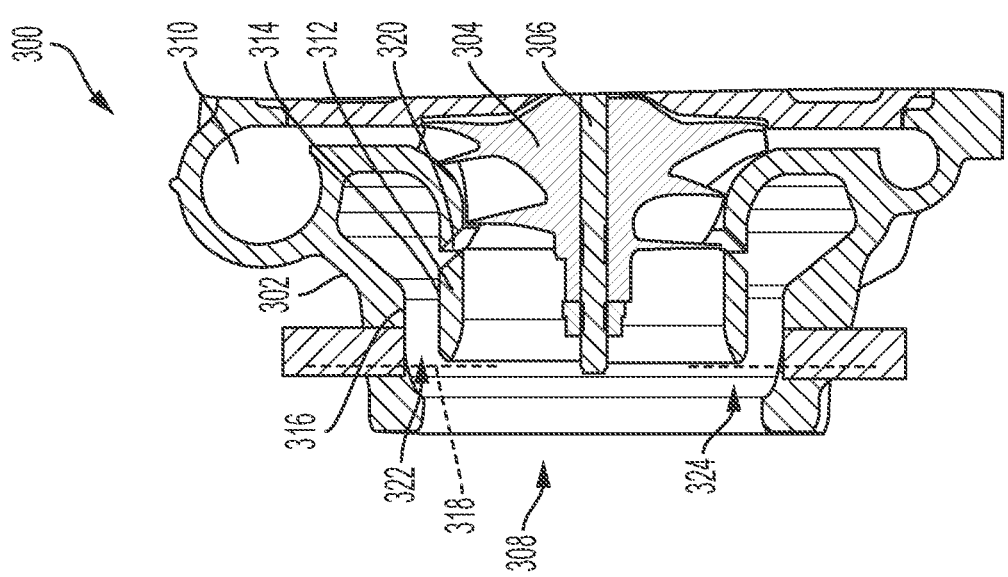
FIG. 3A is a cross-sectional view of a compressor portion of a turbocharger for a vehicle propulsion system in accordance with an exemplary embodiment of the present disclosure.

FIG. 3A is a cross-sectional view of a compressor portion 300 of a turbocharger for a vehicle propulsion system in accordance with an exemplary embodiment of the present disclosure. The compressor portion 300 includes a compressor housing 302. A compressor wheel 304 is mounted in the compressor housing 302 on one end of a rotatable shaft 306. The compressor housing 302 defines an air inlet 308 for receiving air generally axially into the compressor wheel 304. The rotatable shaft 306 is rotated by a turbine wheel (not shown) that is mounted in a turbine portion of the turbocharger, thereby rotatably driving the compressor wheel 304, which compresses air drawn in through the air inlet 308 and discharges the compressed air generally radially outwardly from the compressor wheel into a volute 310. From the volute 310, the air is routed to the intake of an internal combustion engine (not shown) for improving performance of the vehicle propulsion system.

The compressor housing 302 defines a ported shroud system 312 which includes a shroud inner wall 314 and a shroud outer wall 316. The shroud outer wall 316 being spaced radially outward of the shroud inner wall 314 and defining an annular space 318 between the shroud inner wall 314 and the shroud outer wall 316. The ported shroud system 312 further includes a first shroud port 320 formed through the shroud inner wall 314 and extending to the compressor wheel 304 for allowing air to pass between the annular space 318 and the compressor wheel 304. The ported shroud system 312 also includes a second shroud port 322 formed through the shroud inner wall 314 and extending into the air inlet 308 of the compressor housing 302 and positioned upstream of the first shroud port 320 for allowing air to pass between the annular space 318 and the compressor housing air inlet 308. A compressor inlet adjustor 324 is also mounted in the compressor housing 302 of the compressor portion 300. The compressor inlet adjustor 324 is positioned upstream of the ported shroud system 312. The compressor inlet adjustor 324 is continuously adjustable between a fully open configuration, a closed configuration, and an intermediate configuration between the fully open configuration and the closed configuration as will be described in more detail below.

FIG. 3B is an elevation view of the compressor inlet adjustor 324 for the turbocharger of FIG. 3A. The compressor inlet adjustor 324 is operable for adjusting an effective diameter of the air inlet into the compressor wheel 304 and for adjusting the amount of air passing between the air inlet 308 and the annular space 318 through the second shroud port 322. The present invention may be practiced with various types of compressor inlet adjustors that are operable to adjust the effective diameter of the air inlet into the compressor wheel 304 and for adjusting the amount of air passing between the air inlet 308 and the annular space 318 through the second shroud port 322 without limitation. For example, the compressor inlet adjustor 324 may include a ring 326 including arcuate slots 328 which each receives a blade pin 330 of one of a plurality of blades 332. Rotation of the ring 326 may then adjustably move the plurality of blades 332 inward or outward to adjustably define an inner diameter 334 which determines an effective diameter of the air inlet into the compressor wheel 304 and for adjusting the amount of air passing between the air inlet 308 and the annular space 318 through the second shroud port 322.

Figure 4:
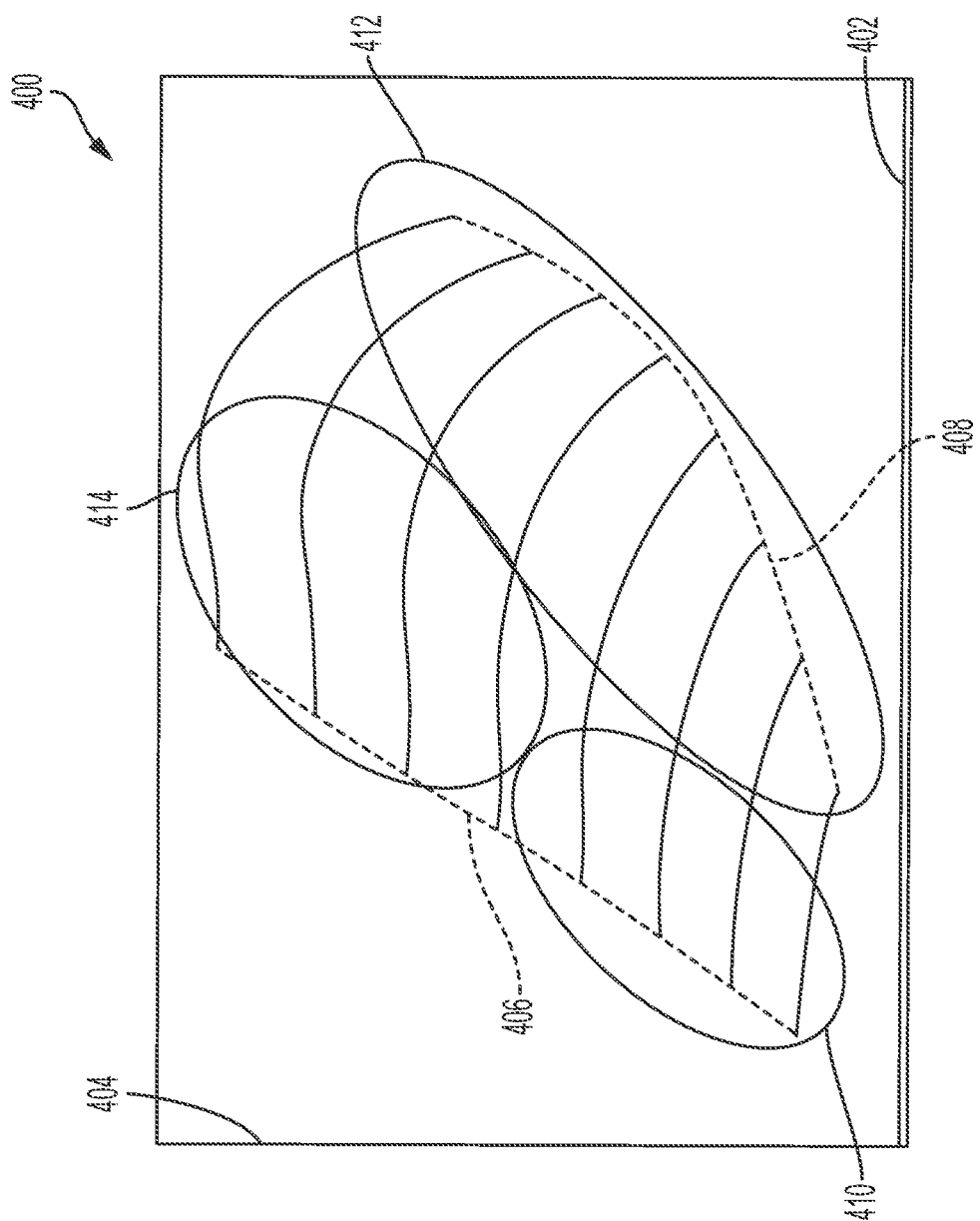
FIG. 4 illustrates a compressor map 400 in accordance with an exemplary embodiment of the present disclosure.

FIG. 4 illustrates a compressor map 400 in accordance with an exemplary embodiment of the present disclosure. The horizontal axis 402 of the compressor map 400 corresponds to a corrected compressor air flow rate and the vertical axis 404 corresponds to a compressor pressure ratio. The compressor map 400 is bounded on the left side of the map 400 by a surge line 406. Operation of the compressor to the left of the surge line 406 results in air momentary backflow of air through the compressor which may adversely affect the operating efficiency of the turbocharger. The compressor map 400 is also bounded on the right side by a choke line 408. Choke conditions develop when gas flow at some point in the compressor reaches sonic velocity. Under choke conditions, decreasing compressor pressure ratio does not produce increased compressor flow for a given speed and inlet conditions. Thus, a compressor map is bounded by a minimum associated with surge conditions and a maximum associated with choke conditions. As a result, it is desirable to maintain operation of the compressor to the right of the surge line 406 and to the left of the choke line 408. Of course, it is desirable to increase the distance between the surge line 406 and the choke line 408 across all conditions in order to increase the operational efficiency of the compressor. A first area 410 is generally characterized by lower compressor air flow rates and a second area 412 is generally characterized by higher compressor air flow rates.

Conventional turbocharger systems and methods may also be operated within the third area 414. However, these conventional systems and methods are not capable of maximizing surge behavior and compressor efficiency by adjusting the configuration of the compressor inlet adjustor to a configuration between the fully open configuration and the ported shroud closed configuration when the turbocharger pressure ratio is higher than a predetermined pressure ratio threshold and the compressor corrected air flow into the compressor housing inlet is less than a maximum compressor corrected air flow of a compressor flow map for the turbocharger compressor. In a preferred embodiment, the predetermined pressure ratio threshold is between about 2 and 2.8 and in yet a more preferred embodiment, the predetermined pressure ratio threshold is about 2.5. In this manner, operation of the compressor at higher pressure ratios enables operation of an engine in a vehicle propulsion system at higher torque at lower engine speeds than had conventionally been possible prior to the present disclosure. In addition to enabling significantly improved operation of the compressor at higher pressure ratios, the present disclosure also retains the benefits of operating in a recirculating ported shroud mode in the third area 414, while also enabling the ported shroud to be closed to operate in second area 412 and improving efficiency in that operating area, and also permitting operation in first area 410 in a virtual trim reduction mode.

FIG. 5A is a cross-sectional view of a compressor portion 500 of a turbocharger with a compressor inlet adjustor 502 in a fully open configuration and FIG. 5B is an elevation view of the compressor inlet adjustor 502 in the fully open configuration. In the fully open configuration, the compressor inlet adjustor 502 does not block any portion of the compressor inlet and also does not block flow of air through the ported shroud system. Conventionally, turbochargers having a compressor inlet adjustor maintain the compressor inlet adjustor in the fully open configuration at high compressor speeds and high pressure ratios which enables the ported shroud system to increase the flow of air into the compressor wheel. These conventional systems maintain the compressor inlet adjustor at the fully open configuration while operating near the choke boundary 408 of the second area 412 of the compressor map 400.

FIG. 6A is a cross-sectional view of a compressor portion 600 of a turbocharger with a compressor inlet adjustor 602 in a ported shroud closed configuration and FIG. 6B is an elevation view of the compressor inlet adjustor 602 in the ported shroud closed configuration. In contrast to the fully open configuration illustrated in FIGS. 5A and 5B, the ported shroud closed configuration of the compressor inlet adjustor 602 closes the ported shroud system and, therefore, prevents flow of air through the ported shroud system. In this configuration, the compressor operates as though it did not have a ported shroud system and does not reduce the effective inlet diameter. Conventionally, turbochargers having a compressor inlet adjustor may position the compressor inlet adjustor in the ported shroud closed configuration at intermediate compressor speeds.

FIG. 7A is a cross-sectional view of a compressor portion 700 of a turbocharger with a compressor inlet adjustor 702 in a reduced inlet configuration and FIG. 7B is an elevation view of the compressor inlet adjustor 702 in the reduced inlet configuration. In a reduced inlet configuration, the compressor inlet adjustor 702 prevents air flow through the ported shroud system and reduces the effective inlet diameter of the air inlet into the compressor. By reducing the effective inlet diameter, the efficiency of the turbocharger compressor may be improved at low compressor flow conditions. Conventional turbochargers may include a compressor inlet adjustor 702 which may operate to reduce the effective inlet diameter of the air inlet into the compressor in low compressor speeds or low compressor air flow represented by the first area 410 of the compressor map 400 in FIG. 4. These conventional systems maintain the compressor inlet adjustor between the ported shroud closed configuration and the reduced inlet configuration while operating in the second area 412 of the compressor map 400 where choked flow or surge is not of any concern.

Figure 8:
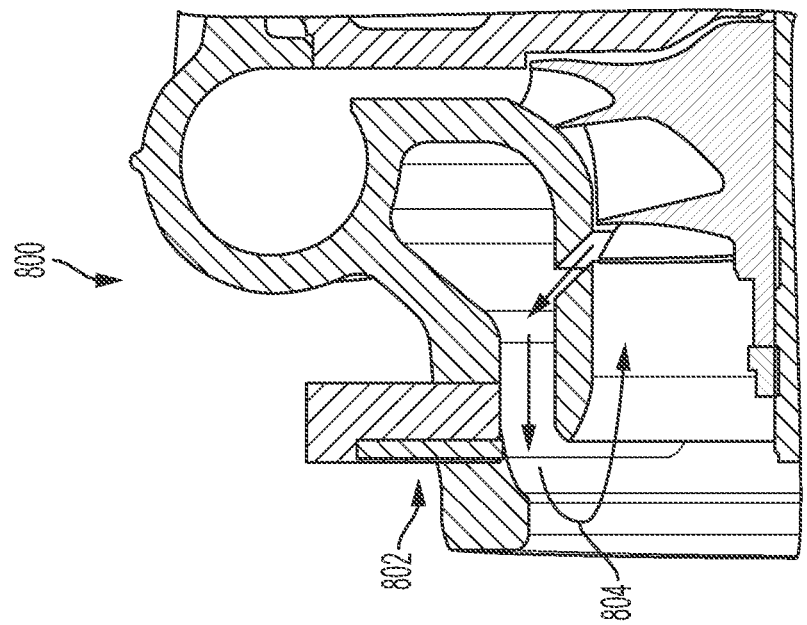
FIG. 8 is a close-up cross-sectional view of a compressor portion of a turbocharger with a compressor inlet adjustor in a fully-open configuration.

FIG. 8 is a close-up cross-sectional view of a compressor portion 800 of a turbocharger with a compressor inlet adjustor 802 in a fully-open configuration. In contrast to the operation of the compressor inlet adjustor 502 illustrated in FIGS. 5A and 5B, the compressor inlet adjustor 802 in accordance with the present disclosure is operated in the fully open configuration at higher pressure ratios and across a wide range of compressor flow rates, including relatively low compressor flow rates. In this manner, the operation of the compressor inlet adjustor 802 permits optimization of a recirculation flow 804 which improves the performance and efficiency of the compressor in third area 414 of the compressor map 400 of FIG. 4. Among other benefits, operation of the compressor inlet adjustor in this manner and under these conditions improves performance and efficiency of an internal combustion engine operating under high torque load conditions and lower speeds.

Figure 9:
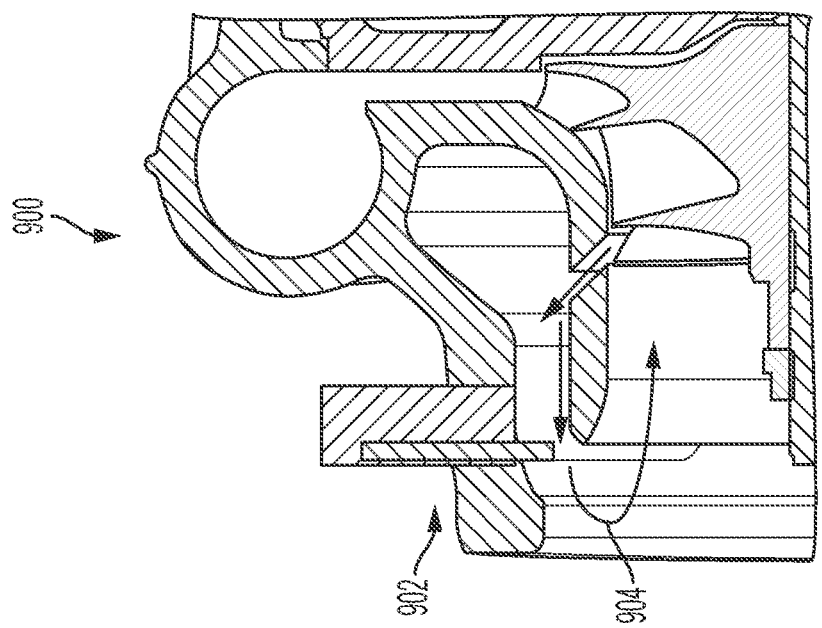
FIG. 9 is a close-up cross-sectional view of a compressor portion of a turbocharger with a compressor inlet adjustor in a partially-open ported shroud recirculation configuration.

FIG. 9 is a close-up cross-sectional view of a compressor portion 900 of a turbocharger with a compressor inlet adjustor 902 in a partially-open ported shroud recirculation configuration. In particular, in the partially-open ported shroud recirculation configuration, the compressor inlet adjustor 902 adjusts the volume of flow recirculating 904 through the ported shroud system. The present disclosure contrasts with conventional compressor systems and operating methods by adjusting the volume of flow recirculating through the ported shroud system in compressor conditions represented by operation at any point within third area 414 of the compressor map 400 of FIG. 4 which is above a pressure ratio of predetermined pressure ratio threshold and across a wide range of compressor flow rates, including relatively lower flow rates. Again, among other benefits, operation of the compressor inlet adjustor in this manner and under these conditions improves performance and efficiency of an internal combustion engine operating under high torque load conditions and lower speeds.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system comprising:
   an internal combustion engine having an exhaust system and an intake system;
   a turbine housing and a turbine wheel mounted in the turbine housing and connected to a rotatable shaft, the turbine housing in communication with the exhaust system for receiving exhaust gas and supplying the exhaust gas to the turbine wheel;
   a compressor housing and a compressor wheel mounted in the compressor housing and connected to the rotatable shaft, the compressor housing having an air inlet wall defining an air inlet for leading air generally axially into the compressor wheel, the compressor housing further defining a ported shroud system defining a shroud inner wall and a shroud outer wall, wherein the shroud outer wall is spaced radially outward of the shroud inner wall and defining an annular space between the shroud inner wall and the shroud outer wall, a first shroud port formed through the shroud inner wall and extending to the compressor wheel for allowing air to pass between the annular space and the compressor wheel, and a second shroud port formed through the shroud inner wall and extending into the air inlet of the compressor housing and positioned upstream of the first shroud port for allowing air to pass between the annular space and the compressor housing air inlet;
   a compressor inlet adjustor positioned in the compressor air inlet and being continuously adjustable between a fully open configuration, a ported shroud closed configuration, and a partially-open ported shroud recirculation configuration between the fully open configuration and the ported shroud closed configuration, wherein the compressor air inlet is narrower than the compressor inlet adjustor in the fully open configuration, wherein an inner radius of the compressor inlet adjustor equals an inner radius of the second shroud port in the ported shroud closed configuration such that the second shroud port is closed and the air inlet of the compressor housing is fully open when in the ported shroud closed configuration;
   a turbocharger compressor temperature module including a compressor inlet air temperature input in communication with a compressor inlet air temperature sensor, and a compressor outlet air temperature input in communication with a compressor outlet air temperature sensor;
   a turbocharger compressor pressure module including a compressor inlet air pressure input in communication with a compressor inlet air pressure sensor, and a compressor outlet air pressure input in communication with a compressor outlet air pressure sensor, wherein the turbocharger compressor pressure module determines a turbocharger pressure ratio based upon the compressor inlet air pressure input and the compressor outlet air pressure input;
   a turbocharger compressor corrected air flow module that determines a compressor corrected air flow into the compressor housing air inlet based upon the compressor inlet air temperature input, compressor outlet air temperature input, compressor inlet air pressure input, and compressor outlet air pressure input; and
   a compressor inlet adjustor control module that adjusts the configuration of the compressor inlet adjustor based upon the turbocharger pressure ratio and the compressor corrected air flow, wherein the compressor inlet adjustor control module adjusts the configuration of the compressor inlet adjustor to a configuration between the fully open configuration and the ported shroud closed configuration when the turbocharger pressure ratio is higher than a predetermined pressure ratio threshold and the compressor corrected air flow into the compressor housing inlet is less than a maximum compressor corrected air flow of a compressor flow map for the turbocharger compressor.

2. The system of claim 1, wherein the compressor inlet adjustor control module adjusts the configuration of the compressor inlet adjustor to the ported shroud closed configuration when the turbocharger pressure ratio is lower than the predetermined pressure ratio threshold and the compressor corrected air flow into the compressor housing inlet is higher than a predetermined compressor corrected air flow.

3. The system of claim 1, wherein the predetermined pressure ratio threshold is between about 2 and 2.8.

4. The system of claim 3, wherein the predetermined pressure ratio threshold is about 2.5.

5. The system of claim 1, wherein the ported shroud system operates in a recirculation mode whereby air flows from the first shroud port to the second shroud port when the compressor inlet adjustor control module adjusts the configuration of the compressor inlet adjustor to a configuration between the fully open configuration and the ported shroud closed configuration when the turbocharger pressure ratio is higher than the predetermined pressure ratio threshold and the compressor corrected air flow into the compressor housing inlet is less than a maximum compressor corrected air flow of a compressor flow map for the turbocharger compressor.

6. The system of claim 1, wherein the compressor inlet adjustor control module adjusts the configuration of the compressor inlet adjustor to a reduced inlet configuration when the turbocharger pressure ratio is lower than the predetermined pressure ratio threshold and the compressor corrected air flow into the compressor housing inlet is less than a predetermined compressor corrected air flow.

7. The system of claim 6, wherein an inner radius of the compressor inlet adjustor is less than an inner radius of the second shroud port in the reduced inlet configuration.

8. An adjustable trim system for a turbocharger compressor including a ported shroud for a vehicle propulsion system, the system comprising:
- a turbine housing and a turbine wheel mounted in the turbine housing and connected to a rotatable shaft;
- a compressor housing and a compressor wheel mounted in the compressor housing and connected to the rotatable shaft, the compressor housing having an air inlet wall defining an air inlet for leading air generally axially into the compressor wheel, the compressor housing further defining a ported shroud system defining a shroud inner wall and a shroud outer wall, wherein the shroud outer wall is spaced radially outward of the shroud inner wall and defining an annular space between the shroud inner wall and the shroud outer wall, a first shroud port formed through the shroud inner wall and extending to the compressor wheel for allowing air to pass between the annular space and the compressor wheel, and a second shroud port formed through the shroud inner wall and extending into the air inlet of the compressor housing and positioned upstream of the first shroud port for allowing air to pass between the annular space and the compressor housing air inlet;
- a compressor inlet adjustor positioned in the compressor air inlet and being continuously adjustable between a fully open configuration, a ported shroud closed configuration, and a partially-open ported shroud recirculation configuration between the fully open configuration and the ported shroud closed configuration, wherein the compressor air inlet upstream of the compressor inlet adjustor is narrower than the compressor inlet adjustor in the fully open configuration, wherein an inner radius of the compressor inlet adjustor equals an inner radius of the second shroud port in the ported shroud closed configuration such that the second shroud port is closed and the air inlet of the compressor housing is fully open when in the ported shroud closed configuration;
- a turbocharger compressor temperature module including a compressor inlet air temperature input in communication with a compressor inlet air temperature sensor, and a compressor outlet air temperature input in communication with a compressor outlet air temperature sensor;
- a turbocharger compressor pressure module including a compressor inlet air pressure input in communication with a compressor inlet air pressure sensor, and a compressor outlet air pressure input in communication with a compressor outlet air pressure sensor, wherein the turbocharger compressor pressure module determines a turbocharger pressure ratio based upon the compressor inlet air pressure input and the compressor outlet air pressure input; and
- a turbocharger compressor corrected air flow module that determines a compressor corrected air flow into the compressor housing air inlet based upon the compressor inlet air temperature input, compressor outlet air temperature input, compressor inlet air pressure input, and compressor outlet air pressure input; and
- a compressor inlet adjustor control module that adjusts the configuration of the compressor inlet adjustor based upon the turbocharger pressure ratio and the compressor corrected air flow, wherein the compressor inlet adjustor control module adjusts the configuration of the compressor inlet adjustor to a configuration between the fully open configuration and the ported shroud closed configuration when the turbocharger pressure ratio is higher than a predetermined pressure ratio threshold and the compressor corrected air flow into the compressor housing inlet is less than a maximum compressor corrected air flow of a compressor flow map for the turbocharger compressor.

9. The system of claim 8, wherein the compressor inlet adjustor control module adjusts the configuration of the compressor inlet adjustor to the ported shroud closed configuration when the turbocharger pressure ratio is lower than the predetermined pressure ratio threshold and the compressor corrected air flow into the compressor housing inlet is higher than a predetermined compressor corrected air flow.

10. The system of claim 8, wherein the predetermined pressure ratio threshold is between about 2 and 2.8.

11. The system of claim 10, wherein the predetermined pressure ratio threshold is about 2.5.

12. The system of claim 8, wherein the ported shroud system operates in a recirculation mode whereby air flows from the first shroud port to the second shroud port when the compressor inlet adjustor control module adjusts the configuration of the compressor inlet adjustor to a configuration between the fully open configuration and the ported shroud closed configuration when the turbocharger pressure ratio is higher than the predetermined pressure ratio threshold and the compressor corrected air flow into the compressor housing inlet is less than a maximum compressor corrected air flow of a compressor flow map for the turbocharger compressor.

13. The system of claim 8, wherein the compressor inlet adjustor control module adjusts the configuration of the compressor inlet adjustor to a reduced inlet configuration when the turbocharger pressure ratio is lower than the predetermined pressure ratio threshold and the compressor corrected air flow into the compressor housing inlet is less than a predetermined compressor corrected air flow.

14. The system of claim 13, wherein an inner radius of the compressor inlet adjustor is less than an inner radius of the second shroud port in the reduced inlet configuration.

* * * * *